Sept. 9, 1941. J. C. HEINTZ 2,255,163
RECAPPING VULCANIZER
Filed Feb. 24, 1939
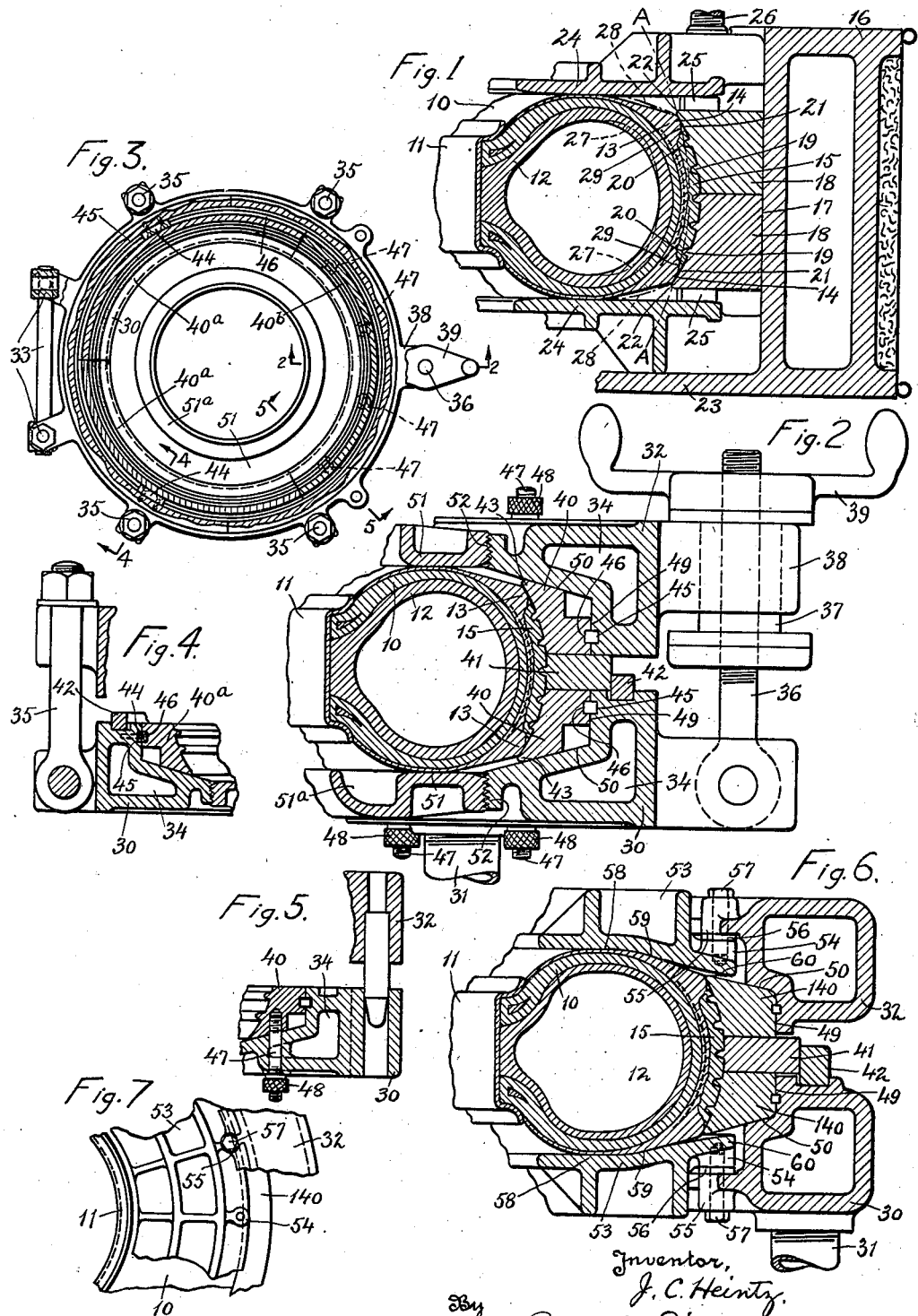

Patented Sept. 9, 1941

2,255,163

UNITED STATES PATENT OFFICE 2,255,163

RECAPPING VULCANIZER

James C. Heintz, Lakewood, Ohio

Application February 24, 1939, Serial No. 258,216

3 Claims. (Cl. 18—18)

This invention relates to vulcanizers for retreading pneumatic tires, including the species of retreading known as recapping, where new rubber is applied to the tread of a tire casing from which the old tread rubber has not been completely removed. One of its objects is to provide an improved matrix adapted for recapping with a band of new rubber narrower than the original tread, located between the worn shoulders of the old tread and having marginal junction seams with the old rubber, flush with the worn old tread rubber. A further object is to provide improved modes of supporting the tire sides while subjected to the action of such a matrix. A still further object is to provide improved means of mounting and retaining the parts of a recapping or other retreading matrix within the heater portion of a vulcanizer, and particularly one of the hinged or watch-case type.

This application is a continuation in part of certain of my prior applications including Ser. No. 200,380, filed April 6, 1938 as a continuation in part of Ser. No. 163,509, filed September 13, 1937, and Ser. No. 184,644, filed January 12, 1938 as a continuation in part of applications Ser. Nos. 85,673 and 85,674, filed June 17, 1936. Serial Nos. 85,673, 184,644 and 200,380 are now respectively Patents Nos. 2,174,188, 2,174,189 and 2,228,211.

Of the accompanying drawing, Fig. 1 is a partial vertical section of a retreading mold or vulcanizer having one form of recapping matrix embodying my invention, together with a rim-mounted pneumatic tire in the vulcanizer, the heater in this case being of the pot or cylindrical jacket form, and the illustration taken from my prior application Ser. No. 200,380.

Fig. 2 is a similar section of the line 2—2 of Fig. 3, showing a retreading vulcanizer of the hinged or watch-case type with a tire therein and a matrix molding face formed similarly to that of Fig. 1, but with a different type of mounting and a modified mode of variably setting the side pressure rings in relation to the matrix, the illustration of this and Figs. 3, 4, and 5 including matter taken from my application Ser. No. 184,644.

Fig. 3 is a plan view on a smaller scale, partly in section, of the embodiment shown in Fig. 2.

Fig. 4 is a detail section on the line 4—4 of Fig. 3.

Fig. 5 is another detail section on the line 5—5 of Fig. 3.

Fig. 6 is a section corresponding to Figs. 1 and 2, showing a second modification, with a tire therein.

Fig. 7 is a fragmental plan view, partly broken away, of the upper part of this second modification.

Referring at first to Fig. 1, 10 is a pneumatic tire casing, having a worn rubber tread requiring renewal, 11 is a curing rim on which the tire is mounted and 12 is the usual annular, inflatable, elastic rubber curing bag or core. The contour of the old tread of this tire, from which the original rubber has been worn off to or through the bottoms of the tread grooves which separate the anti-skid projections, is represented approximately by the line A—A, leaving the depth of the marginal shoulder rubber 13 greater than that in the middle of the tread and adapted for sealing contact with my improved matrix at said worn contour line A—A. The new rubber could be applied to the old with only a preliminary cleaning and cementing or without substantial removal of the old rubber other than a shallow rasping, as described in one mode of practicing the method of my application Ser. No. 200,380, making a joint which coincides with the old worn contour throughout the width of the new rubber. Or the old rubber could, as herein illustrated and described as the preferred procedure in my aforesaid application, be grooved or channeled out with a rotary rasp to leave outstanding marginal ribs 14 of the old rubber for sealing against the matrix. 15 represents the new tread rubber, applied against the roughened and cemented surface of the old channelled tread wall and shown as though softened and partly molded by the hot matrix before vulcanization.

The heater part of this particular vulcanizer is a steam-jacketed structure 16 of well-known form, having a cylindrical backing wall 17 for the illustrated matrix. The latter comprises a pair of segmental rings 18, preferably of aluminum, forming a longitudinally and radially divided tread mold which has a concave molding face. These rings are usable with an ordinary segmental spacer ring (not shown in this view) between them, if required for certain tread widths. The molding face is formed with suitable projections, such as longitudinal ribs 19, for forming recesses and adjacent anti-skid projections in the new tread rubber. In this case the two marginal grooves 20 formed by the corresponding matrix ribs, as well as intermediate grooves, are located wholly in the new rubber.

According to this invention, the contour of the matrix molding face is such that its marginal portions 21 are adapted to fit the worn ground-engaging surfaces of the shoulder rubber 13 and tightly seal the latter when the tire is inflated to the usual curing pressure of 150 to 200 pounds per square inch, to confine and substantially prevent lateral overflow of the new tread rubber, without the use of tread-flanking mold ribs or flanges, thereby forming flush seams or joints between the old and new rubber and providing a composite recapped tread having the full width of the original tread, wherein the original shoulders act as marginal supporting surfaces when the tread is fully flattened transversely against the ground.

In this embodiment, the matrix is shown with eaves-like edge portions 22 overhanging the flanks of the tire tread and making the matrix, by a proper selection of its component rings, slightly wider than the widest tread to be accommodated therein—or of indeterminate width in relation to the tread width, so that a considerable range of tread widths can be accommodated in the same matrix.

The matrix 18, 18, being vertically adjustable against the cylindrical heater surface 17, according to the particular tread width, has to be vertically centered in relation to the tire. The heater structure 16 includes a bottom shelf 23 on which is mounted a lower side pressure ring 24 having a plane or flat top surface engaging the side of the tire casing 10 and maintained at a non-vulcanizing temperature by restricting heat conduction thereto from the steam jacket of the heater. There is a similar pressure ring 24 on the upper side and these rings between them define a tire-receiving space of predetermined depth. The spacing of the rings 24 is established and the matrix rings 18 are centered in relation thereto by means of a series of spacer blocks 25 of a selected thickness, interposed between the overlapping outer margins of the rings 24 and inner margins of the rings 18, the assemblage being finally drawn and held together by the usual clamping screws 26.

Between the matrix edges and the adjacent zones where the rings 24 tangentially contact the tire sides, the shoulder flanks are unconfined, so that when the tire is inflated to curing pressure, its shoulder sides may bulge as indicated by the inner and outer dot-and-dash lines 27, 28, permitting the marginal tire ribs 14 to be forced with a heavy molding and sealing pressure against the matrix surfaces 21. When the inflation pressure is discharged and the recapped tire removed from the mold, its shoulders relatively recede, to leave its worn margins with a smaller convexity, corresponding to the contour line A—A, than the convexity of the new vulcanized rubber 15.

In the operation of the foregoing, the tire to be recapped has its worn surface properly prepared and a recap band of new rubber applied thereto as previously described. The raw-treaded tire is then measured as to diameter and cross section, a matrix 18 of the corresponding cavity size and spacer blocks 25 of proper thickness are selected, the lower matrix ring and blocks placed in the heater, and the rim-mounted tire, having its tread of approximately the shape and size of the mold cavity is placed in the lower mold half. The segments of the upper matrix ring, the upper spacer blocks and the upper side ring 24 are then applied and the assemblage clamped together by means of the screws 26. Before inflation to curing pressure, slight annular clearances 29 may be present at the edges of the new rubber, but these are closed up by pressure and flow of the heated rubber when the full internal pressure is applied and the tire flanks bulged as indicated by the lines 27, 28, in making the flush seam or joint between the new and old rubber. If the uninflated raw tire diameter is a little undersize, it is increased in the mold by compressing the tire sides with the rings 24, and if slightly oversize, some force is used in fitting the tire into the lower half of the mold, before closing the upper half thereon.

In the modification shown in Figs. 2 to 5, inclusive, a heater of the longitudinally-divided, hinged or watch-case type is employed, together with a mold or matrix having members demountably fixed on the heater parts in an improved manner and formed with a molding cavity of the same type as shown in Fig. 1, together with side pressure rings having a novel form of lateral adjustment. 30 is an annular lower heater part or platen adapted to be supported in a horizontal position on the floor by legs 31, and 32 is a complemental annular upper heater part or platen connected with the lower platen at the rear side of the vulcanizer by a hinge designated generally at 33, which is vertically adjustable to vary the spacing of the upper platen from the lower one, as disclosed in my prior Patents 2,174,188 and 2,174,189.

The platens are annularly chambered with steam heating jackets 34 and are adapted to be drawn together upon the work by means of adjustable screw-and-nut clamping bolts 35, 36, whose stems are pivoted upon the lower platen to swing into and out of clamping position. The screw stem of the bolt 36, pivoted at the front of the vulcanizer, opposite to the hinge, is provided with a double-acting nut 37 having upper and lower flanges respectively engaging the top or the bottom face of a forked lug 38 on the upper platen, to exert either a mold-closing or a mold-opening or cracking action upon the upper platen, together with a hand wheel 39 on said nut, adapted to receive a turning bar for extra leverage.

Complemental annular, segmental mold members or matrix rings 40 are detachably secured to the lower and upper platens 30, 32 respectively and adapted to be used with or without a segmental spacer ring 41, backed by a detachable segmental locking ring 42. The matrix rings have overhanging or eaves-like free edges 43 and a transversely concave molding face or cavity of approximately the same diameter as the tread of the uninflated tire 10, the latter being mounted on a curing rim 11 and containing an expansible rubber bag or core 12. The new rubber tread or recap band 15 is thereby molded upon the tire casing and its edges sealed with flush seams or joints against the old worn tread shoulders 13, when heat is applied and the tire inflated to molding pressure, as previously described in connection with Fig. 1. These matrix rings 40 and 41 are commonly made of aluminum and the platens of cast iron, and the spacer ring is not fastened to the main rings, so that it is easily stripped from a vulcanized tread.

Each of the matrix rings 40 is made in a suitable number of segments, such as three of equal length, and provided with a quick-detachable mounting on its platen 30 or 32. The two segments 40ª adjacent to the hinged side of the vulcanizer have a tongue-and-groove engagement with the platen, constituted by an inwardly-projecting arcuate tongue, key member or gib 44 of rectangular section, fixed in a holder groove 45 on the platen and fitting in a registering groove 46 in the cylindrical back or outer face of the segment, the engagement being effected by an outward, substantially radial, sliding, edgewise movement of the segment in or parallel with the plane of the platen.

The third matrix segment 40ᵇ in each platen, located at the front, opposite to the hinged side of the vulcanizer, and acting as a "keystone" or key segment for the other two, is adapted to be inserted and removed by an axial sliding movement and retained in place by a series of vertical screw rods or studs 47, four in number, attached at their inner ends to said key segment, extending through holes in the platen 30 or 32 and detachably secured on the outer side of the latter by knurled thumb nuts 48. When either half of the vulcanizer is to have its matrix changed for one of a different size or pattern, it is a simple matter to detach the nuts 48, axially retract the key segment 40ᵇ inwardly, then remove the two segments 40ᵃ by sliding them radially toward the center and effect the replacement with substitute parts.

For mounting each of the matrix or mold members 40 in heat-transmitting contact with its platen 30 or 32, said platen is shown with two seating portions or surfaces constituting a matrix holder, namely a cylindrical one 49 containing the keyholder groove 45, coacting with the complemental cylindrical outer face of the main matrix ring, and a female conical or generally concave seating surface 50 including several matrix seating zones, located laterally outward and radially inward of the cylindrical seat 49, coacting with a complemental male cone or generally convex seating surface on the platen, which in this case is spaced from the cylindrical surface to save metal, although that is not essential. While the radial angle of these conical surfaces to a horizontal or normal plane could vary, it is preferably of the order of 15 to 20 defaces and range of mold diameters which can grees, to afford the best combination of width of contact zone between the pairs of conical surbe accommodated between the two platens, the purpose being to accommodate in the same heater a range of tire casings, varying widely as to outer and cross-sectional diameters, by providing a corresponding range of matrix sizes.

Each half of the vulcanizer is provided with a non-vulcanizing, tangent pressure ring 51, for engaging and more or less compressing the side of the tire when the platens are brought together, said ring having a screw-threaded joint 52 with the platen 30 or 32 between its outer periphery and inner periphery of said platen, enabling the pressure ring to be set or adjusted to conform to the size of the tire under treatment, before inserting the latter. Other forms of ring adjustment could be used. The shoulder sides or flanks of the tire are exposed between its zones of contact with said rings and the edges 43 of the matrix rings, and free to bulge outwardly to a slight extent under the force of inflation pressure in the bag 12.

The back of the upper ring 51 is trough-shaped and the inner periphery of the lower one formed with an auxiliary trough 51ᵃ, to receive cooling water when required. When these pressure rings have been properly adjusted and a deflated, rim-mounted tire fitted to the lower half of the vulcanizer, with or without a spacer ring 41 according to the width of the particular tread, the upper platen is closed and the two clamped upon the tire, and the latter is then inflated to the desired internal pressure for vulcanization, the inflation forcing its tread radially outward and perfecting the tread-shoulder seal between new and old rubber against the marginal matrix surfaces.

In the watch-case vulcanizer modification shown in Figs. 6 and 7, the lower and upper annular steam-jacketed heater parts or platens 30, 32 are formed with matrix seats of the same general form as in Figs. 2 to 5, including cylindrical portions 49, and conical portions 50 radially narrower than those of Fig. 2, each of the latter including only a single seating zone for the corresponding main recapping matrix ring 140, whose segments may be detachably retained on the heater seats in the manner previously described. In this case the matrix rings 140 have no substantial overhang beyond the tread edges of the tire casing 10, but they and the spacer ring 41, if one is used, are selected with reference to the tread width of the tire to be recapped, so that said tread width may be substantially the same as the width of the tread-contacting face of the matrix, or slightly less, approximately as shown in Fig. 6. With this relatively narrower matrix, I prefer to employ a pair of non-vulcanizing side pressure rings 53, each detachably supported on the corresponding platen 30 or 32 in an invariable relation thereto, by pairs of lugs 54, 55, on the ring and platen respectively, separated by washers 56 of insulating material such as asbestos and fastened together by screws 57. The rings 53 have parallel or tangent portions 58 fitting the middle of the tire sides and, radially and outwardly continuous therewith, convergent portions 59 which start with a curve to fit the curve of the tire sides at the base of its shoulders and end with marginal conical portions 60 which overlap and are narrowly spaced from the sides of the matrix rings 140 and carry the lugs 54 at their backs. A rim-mounted tire casing 10 bearing a raw band 15 of recap rubber is placed in an uninflated condition in the lower half of such a vulcanizer, and the upper half or platen is closed and clamped upon the lower half. Prior to full inflation, the tire tread flanks are narrowly spaced from and exposed adjacent to the convergent portions 59 of the side rings 53, from which they progressively diverge as shown in Fig. 6, but upon inflation of the tire to vulcanizing pressure, its shoulder flanks may bulge slightly to find lateral support against said convergent portions of the side rings, which limit the amount of bulge. Among other desirable results, this dispenses with the necessity for employing adjustable side rings, and avoids rounding of the tread edges by flank bulging of the extent permitted with the vulcanizer shown in Figs. 1 and 2, thus producing somewhat sharper tread edges of better appearance. This embodiment may be used with the method of tire measuring and mold fitting covered in my Patent No. 2,047,684 of July 14, 1936.

It will be understood that other modifications could be effected within the scope of my invention as defined in the claims.

I claim:

1. A tire retreading mold comprising a pair of annular platens forming a heater, a recapping matrix including members detachably mounted on the respective platens, said matrix having a transversely concave tread-molding cavity shaped to confine only the wearing surface of the tread, leaving its flanks exposed, and including marginal tread molding and sealing portions shaped to fit the old tread shoulders of the worn tire and form substantially flush seams or joints between the new and old rubber in said wearing surface, and a pair of non-vulcanizing side pressure rings fixedly mounted on the respective platens, having portions convergent radially outward and overlapping and laterally spaced from the matrix members to limit outward bulging of the shoulder flanks of a tire inflated against the matrix.

2. Tire retread apparatus comprising a pair of separable annular heater platens each formed with female conical and adjacent cylindrical matrix seats, a recapping matrix including rings detachably mounted on the respective platens and each complementally formed with male conical and cylindrical seating portions engaging said seats of the platen, and non-vulcanizing side pressure members fixedly attached to the respective platens, having parallel portions adapted to confine the middle of the tire sides, and portions convergent radially outward and marginally overlapping and spaced from the sides of the matrix rings to limit outward bulging of the shoulder flanks of a tire inflated against the matrix rings.

3. A full-circle tire retreading mold comprising a pair of annular steam-jacketed platens hingedly connected at their rear side, each having a plurality of fixedly-mounted members of a tongue-and-groove matrix lock on its inner rear side only, an annular matrix in each platen having a plurality of segments formed with complemental locking members engageable with the first-said members by a rearward, substantially radial, sliding edgewise movement of said segments, and a key segment on the front side insertible by an axial movement between forward ends of the rear segments, and axially-extending screw fastener means for detachably fastening said key segment on the platen.

JAMES C. HEINTZ.